United States Patent [19]

Varadaraj et al.

[11] Patent Number: 5,300,227

[45] Date of Patent: Apr. 5, 1994

[54] BIOREMEDIATION OF HYDROCARBON CONTAMINATED SOILS AND WATER

[75] Inventors: Ramesh Varadaraj, Flemington; Cornelius H. Brons, Washington, both of N.J.

[73] Assignee: Exxon Research and Engineering Company, Florham Park, N.J.

[21] Appl. No.: 54,372

[22] Filed: Apr. 28, 1993

[51] Int. Cl.⁵ .................. E02B 15/04; A23L 1/202; B01J 13/00; C02F 3/02
[52] U.S. Cl. .................. 210/610; 210/631; 210/925; 252/312; 252/356; 252/357; 435/244; 134/40
[58] Field of Search ............ 210/610, 611, 631, 747, 210/922, 925; 435/243, 244, 248, 281; 252/180, 181, 312, 356, 357, 352; 134/40, 42

[56] References Cited

U.S. PATENT DOCUMENTS

| | | | |
|---|---|---|---|
| 3,959,127 | 5/1976 | Bartha et al. | 210/11 |
| 4,382,873 | 5/1983 | Gatellier et al. | 252/312 |
| 4,401,762 | 8/1983 | Tellier et al. | 435/243 |
| 4,460,692 | 7/1984 | Tellier et al. | 435/248 |
| 4,469,603 | 9/1984 | Lepain et al. | 252/312 |
| 4,588,506 | 5/1986 | Raymond et al. | 210/610 |
| 5,160,488 | 11/1992 | Stillman | 210/610 |

*Primary Examiner*—Thomas Wyse
*Attorney, Agent, or Firm*—Joseph J. Dvorak

[57] ABSTRACT

Simply stated, the present invention employs a surfactant system for treatment of hydrocarbon contaminated soils and water that increases the interface between the hydrocarbon contaminant, microbial nutrients and microflora, and also stimulates the propagation of the microflora, thereby enhancing microbial degradation of the hydrocarbon contaminant.

12 Claims, No Drawings

BIOREMEDIATION OF HYDROCARBON CONTAMINATED SOILS AND WATER

FIELD OF THE INVENTION

This invention relates to novel types of bifunctional surfactants suitable for enhancing the microbiological degradation of hydrocarbons in soils and water.

BACKGROUND OF THE INVENTION

As is well known, there are several microbial species found in soil and water that are capable of assimilating petroleum hydrocarbons. Unfortunately, the rate of microbial assimilation of petroleum hydrocarbons is relatively slow. It is necessary, therefore, to stimulate the microbial assimilation if bioremediation is to be utilized in removing such pollutants from soils and water.

In general, the rate and extent of microbial utilization of petroleum hydrocarbons is limited by the concentration of microbial nutrients and microflora available at the hydrocarbon-water interface. Thus, microbial nutrients, especially nitrogen-containing nutrients like urea, have been added to contaminated soil or water as a method for enhancing the biodegradation of the petroleum contaminants. Because these nitrogen-containing microbial nutrients are generally water soluble and because the petroleum hydrocarbons are hydrophobic, the nutrients are generally delivered in an aqueous solution, along with a surfactant which aids in delivering the microbial nutrients to the hydrocarbon-water interface. Although this approach is useful, there remains a need for increasing the microflora available for hydrocarbon assimilation in order to further enhance the bioremediation process.

Accordingly, it is an object of the present invention to provide an improved composition and method for stimulating the propagation of naturally occurring hydrocarbon assimilating microflora to enhance the bioremediation of hydrocarbon contaminated water and soils.

SUMMARY OF THE INVENTION

Simply stated, the present invention employs a surfactant system for treatment of hydrocarbon contaminated soils and water that increases the interface between the hydrocarbon contaminant, microbial nutrients and microflora, and also stimulates the propagation of the microflora, thereby enhancing microbial degradation of the hydrocarbon contaminant.

The surfactant system of the present invention comprises a mixture selected from the group consisting of (i) an aqueous solution of microbial nutrients and at least one surfactant having the general formula

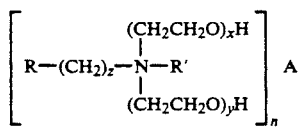

wherein R is hydrogen or an alkyloxide of from about 5 to about 20 carbon atoms; x and y are integers, the sum of which is from 2 to about 20; z is an integer of from about 8 to 22 when R is hydrogen and from about 2 to 5 when R is an alkyloxide; R' is H or —CH$_3$; A is an anion selected from NO$_3$—, oxy anions of phosphorus and organo carboxylic acid anions and n is an integer equal to the valance charge of A; and (ii) a microbial assimilable phosphorus-containing organic compound and at least one surfactant having the above formula in which A is NO$_3$— and n is 1.

DESCRIPTION OF THE PREFERRED EMBODIMENTS

The present invention provides for enhanced bioremediation of hydrocarbon contaminated soils and waters by treating the soil and water at least one surfactant having the general formula

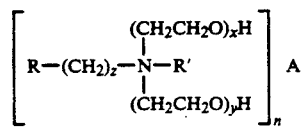

wherein R is hydrogen or an alkyloxide of from about 5 to about 20 carbon atoms; x and y are integers, the sum of which is from 2 to about 20; z is an integer of from about 8 to 22 when R is hydrogen and from about 2 to 5 when R is an alkyloxide; R' is H or —CH$_3$; A is an anion selected from NO$_3$—, oxy anions of phosphorus and organo carboxylic acid anions and n is an integer equal to the valance charge of A.

In treating the contaminated soil or water, the surfactant generally constitutes part of a surfactant system. For example, the surfactant may be combined with an aqueous solution of microbial nutrients such as urea. Alternatively, when A in the surfactant is NO$_3$—, the surfactant may be combined with a microbial assimilable phosphorus-containing compound such as trilaureth phosphate or a surfactant of the above formula in which A is an oxy anion of phosphorus such as PO$_4$≡ or HPO$_4$=.

When the surfactant system is a mixture of at least one of the above surfactants and an aqueous solution of microbial nutrients, A in the surfactant preferably is an anion of an organo carboxylic acid. Suitable organo carboxylic acid anions include anions of aliphatic mono and dicarboxylic acids, aromatic carboxylic acids, and substituted aromatic carboxylic acids, especially aromatic hydroxy carboxylic acids. In general, the aliphatic carboxylic acid anions will have from 2 to 20 carbon atoms and the aromatic carboxylic and aromatic hydroxy carboxylic acid anions will have from about 7 to about 20 carbon atoms and from 1 ring to about 3 condensed aromatic rings.

The compounds having the above formula in which R' is H are readily prepared by contacting an ethoxylated alkyl amine or mixtures thereof corresponding to the surfactant with an acid. Compounds having the above formula in which R' is methyl are readily prepared by ion exchange of the quaternary methyl ammonium halides corresponding to the surfactant.

The acid used is selected from the group consisting of H$_2$SO$_4$, H$_2$PO$_4$, HNO$_3$, aliphatic mono and dicarboxylic acids of from about 2 to about 20 carbon atoms, such as acetic and succinic acids, aromatic carboxylic acids and aromatic hydroxy carboxylic acids of from about 7 to about 20 carbon atoms and from 1 ring to about 3 condensed aromatic rings. Specific examples of such aromatic carboxylic acids include pthalic acid and salicylic acid. Similarly, the ion exchanged for the halide in the quaternary methyl ammonium halide corresponding to the surfactant will be selected from ions of the foregoing acids.

In general, the ratio of ethoxylate amine to acid will be stoichiometric and the contacting typically will be at ambient temperature. As will be readily appreciated, neither the ratio of reagent, nor the time or temperature of contacting are critical.

Ion exchange may be conducted under typical ion exchange conditions well known in the art.

An important aspect of the present invention is the fact that the employed surfactant speeds up the natural process of biological degradation by performing two functions: (1) increasing the interface between the hydrocarbon contaminant in the soil or water, the microflora and nutrients and (2) propagation of the microflora by supplying a readily bioassimilable carbon source at the interface.

Another feature of the present invention is that many of the surfactants described herein are water soluble. Therefore, they are advantageously employed in combination with an aqueous solution of other microbial nutrients, including a supply of additional nitrogen and phosphorus. For example, various compounds such as ammonium nitrate, ammonium phosphate, urea, proteins, amino acids, alkali metal ammonium phosphates and nitrates which are readily soluble in water, are quite suitable for use in conjunction with the surfactant of the present invention.

In those instances when the surfactant is not water soluble, a co-solvent may be employed. Suitable co-solvents include alcohols such as isopropyl alcohol.

Optionally, in those instances when the surfactant is not water soluble, they can be delivered to the contaminated soil or water in the form of an emulsion or microemulsion.

A typical composition for treatment of contaminated soil or water will contain from 5 to 50 wt. % surfactant, from about 5 to about 45 wt. % water, from about 10 to about 25 wt. % nitrogen source such as urea and about 10 to about 30 wt. % of a phosphorus source.

Alternatively, the surfactant system may include a surfactant of the above formula in which A is $NO_3-$ and a bioassimilable organic phosphorus-containing compound such as trilaureth phosphate or a surfactant of the above formula in which A is an oxy anion of phosphorus, such as $HPO_4=$ or $PO_4\equiv$. Generally, the ratio of surfactants will be such that the N:P ratio will range from about 10:0.1 to about 10:5.

Specific illustrative compositions are given in Table I below.

TABLE II

| Composition | Interfacial Properties | | |
|---|---|---|---|
| | IFT[1] (dynes/cm) | DCA[2] (Degrees) | |
| | | Teflon (Adv/Rec) | Parafilm (Adv/Rec) |
| Water/Urea | NM | 103/80 | 108/90 |
| 1 | 4.74 | 38/27 | 69/45 |
| 2 | .66 | 59/45 | 71/49 |
| 3 | 1.12 | 51/22 | 67/39 |
| 4 | 4.59 | 66/38 | 65/25 |

[1]The interfacial tension (IFT) was determined by the pendant drop method using 520°–1050° F. cut of crude petroleum and 10 wt. % of the composition.
[2]The dynamic contact angle (DCA) was determined by the immersion-emersion technique using a Cahn balance DCA analyzer. Advancing and receding contact angles (Adv/Rec) are reported.
NM = Beyond the scale of measurement by the method used.

The oil dispersion properties of typical compositions of this invention are shown in Table III. These values were determined on samples of a crude distillate treated with 10 wt. of each composition using a Coulter Counter.

TABLE III

| Composition | Oil Dispersion Properties | |
|---|---|---|
| | Dispersed Vol., % | Dispersed Area, $Cm^2/ml$ |
| 3 | 60.2 | 50.7 |
| 4 | 85.7 | 56.4 |

The foregoing compositions are applied to petroleum contaminated soil or water at a rate of about 5 to about 30 parts by weight of formulation per 100 parts of contaminant in the soil or water.

EXAMPLES 1 TO 4

The hydrocarbon biodegradation performance of a number of compositions of the present invention was determined by treating samples of a 520°–1050° F. distillation cut of a crude oil with 10 wt. % of the compositions listed in Table IV below. These samples were innoculated with preacclimated microbes from a process water biological oxidation unit of a commercial petroleum refinery. The percentage of hydrocarbon biodegraded after 14 days was determined both by gravimetry and by GC and the values are given in Table IV. Also shown is the percent hydrocarbon degraded that is resolvable by GC, which is largely linear and branched alkanes and those hydrocarbons unresolvable by GC, which are largely cyclic and polyaromatic hydrocarbons.

TABLE I

| Compositions | N-Source, Wt. % | P-Source, Wt. % | C-Source, Wt. % | Solvent, Wt. % | Co-Solvent, Wt. % |
|---|---|---|---|---|---|
| 1 to 4 | Urea, 15.1 | TLP, 24.0 | Eth-X, 26.0 | $H_2O$, 24.9 | IPA, 10.0 |
| 5 to 8 | Urea, 15.1 | TLP, 24.0 | Eth-X, 26.0 | $H_2O$, 34.9 | — |
| 9 to 12 | Urea, 22.8 | TLP, 24.0 | Eth-X, 26.0 | $H_2O$, 27.2 | — |
| 13 to 16 | Urea, 16.1 | Eth-P, 13.3 | Eth-X, 28.9 | $H_2O$, 41.7 | — |
| 17 to 20 | Urea, 22.8 | Eth-P, 13.3 | Eth-X, 28.9 | $H_2O$, 35.6 | — |
| 21 | CEAN, 91.6 | TLP, 84 | — | — | — |
| 22 | CEAN, 84.5 | TLP, 15.5 | — | — | — |

TLP: Trilaureth phosphate
Eth-X: Poly(n)oxyethylene isodecyloxypropylammonium salt of acetic, succinic, salicylic and pthalic acid, respectively
Eth-P: Poly(n)oxyethylene isodecyloxypropylammonium salt of phosphoric acid
IPA: Isopropyl alcohol
CEAN: Cocomethyl-[ethoxylated(2)]-ammonium nitrate The interfacial properties of some of these compositions are compared to a water-urea solution in Table II below:

TABLE IV

| Example | Composition | By Gravimetry | By GC | % Resolvable GC | % Unresolvable GC |
|---|---|---|---|---|---|
| | | | | % Hydrocarbon Biodegraded | |
| 1 | 1 | 17.9 | 15.9 | 1.5 | 19.5 |
| 2 | 2 | 24.5 | 27.2 | 11.5 | 31.2 |
| 3 | 3 | 45.5 | 57.9 | 44.1 | 61.6 |
| 4 | 4 | 48.8 | 32.0 | 16.0 | 36.1 |

In general, the above compositions were from about 1.7 to about 3.8 times more effective when compared with a water-urea treat composition.

What is claimed is:

1. A surfactant system for enhancing the biodegradation of hydrocarbons in soil or water comprising a mixture selected from the group consisting of (i) an aqueous solution of microbial nutrients and at least one surfactant having the formula

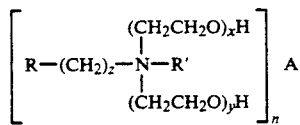

wherein R is hydrogen or an alkyloxide of from about 5 to about 20 carbon atoms; x and y are integers, the sum of which is from 2 to about 20; z is an integer of from about 8 to 22 when R is hydrogen and from about 2 to 5 when R is an alkyloxide; R' is H or —CH$_3$; A is an anion selected from NO$_3$—, oxy anions of phosphorus and organo carboxylic acid anions and n is an integer equal to the valance charge of A; and (ii) a microbial assimilable phosphorus-containing organic compound and at least one surfactant having the above formula in which A is NO$_3$— and n is 1.

2. The system of claim 1 wherein the mixture is (i), R' is H, and A is an anion of an organo carboxylic acid.

3. The system of claim 2 wherein R is an alkyloxide.

4. The system of claim 3 wherein A is an anion of an aliphatic carboxylic acid having from 2 to about 20 carbon atoms.

5. The system of claim 3 wherein A is an anion of aromatic carboxylic acid.

6. The system of claim 3 wherein A is an anion of a hydroxy aromatic carboxylic acid.

7. The system of claim 1 wherein the mixture is (ii), A is NO$_3$—, R' is —CH$_3$ and the phosphorus-containing compound is trilaureth phosphate.

8. The system of claim 1 wherein the mixture is (ii), A is NO$_3$ and the phosphorus-containing compound is a surfactant of the above formula in which A is an oxy anion of phosphorus.

9. In the method for depolluting petroleum contaminated soil and water bodies by spreading onto the bodies a composition containing a surfactant, the improvement comprising using at least one surfactant having the formula

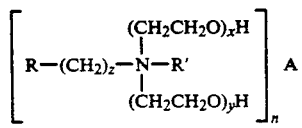

wherein R is hydrogen or an alkyloxide of from about 5 to about 20 carbon atoms; x and y are integers, the sum of which is from 2 to about 20; z is an integer of from about 8 to 22 when R is hydrogen and from about 2 to 5 when R is an alkyloxide; R' is H or —CH$_3$; A is an anion selected from NO$_3$—, oxy anions of phosphorus and organo carboxylic acid anions and n is an integer equal to the valance charge of A.

10. The improvement of claim 9 wherein the surfactant used is combined with an aqueous solution of microbial nutrients to provide a treatment formulation and the formulation is applied at a rate of from about 5 wt. % to about 30 wt. % based on the weight of petroleum contaminant.

11. The improvement of claim 9 wherein A is NO$_3$—, R' is —CH$_3$, and the surfactant is combined with a microbial assimilable phosphorus-containing organic compound.

12. The improvement of claim 11 wherein the phosphorus-containing compound is trilaureth phosphate.

* * * * *